United States Patent
Park et al.

(10) Patent No.: US 11,472,259 B2
(45) Date of Patent: Oct. 18, 2022

(54) SYSTEM AND METHOD FOR CONTROLLING AIR CONDITIONING AND ISG SYSTEMS FOR VEHICLE

(71) Applicants: Hyundai Motor Company, Seoul (KR); Kia Motors Corporation, Seoul (KR)

(72) Inventors: Ji Min Park, Gyeonggi-do (KR); Sang Ku Hur, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 799 days.

(21) Appl. No.: 15/831,743

(22) Filed: Dec. 5, 2017

(65) Prior Publication Data

US 2019/0077221 A1    Mar. 14, 2019

(30) Foreign Application Priority Data

Sep. 14, 2017  (KR) .......................... 10-2017-0117754

(51) Int. Cl.
  *B60H 1/22*   (2006.01)
  *B60H 1/00*   (2006.01)
  *F02N 11/08*  (2006.01)

(52) U.S. Cl.
  CPC ....... *B60H 1/00778* (2013.01); *B60H 1/0065* (2013.01); *B60H 1/00785* (2013.01);
  (Continued)

(58) Field of Classification Search
  CPC .. B60H 1/0065; B60H 1/00385; B60H 1/004; B60H 1/2218; B60H 2001/2262;
  (Continued)

(56) References Cited

U.S. PATENT DOCUMENTS

| | | | | |
|---|---|---|---|---|
| 6,073,456 A | * | 6/2000 | Kawai | B60W 10/06 62/133 |
| 6,516,621 B2 | * | 2/2003 | Homan | B60H 1/3207 62/133 |

(Continued)

FOREIGN PATENT DOCUMENTS

| | | |
|---|---|---|
| CN | 101949572 A | 1/2011 |
| JP | 2000289454 A * | 10/2000 |

(Continued)

OTHER PUBLICATIONS

Isshi et al., JP 2016-047665 A English machine translation, Apr. 7, 2016. (Year: 2016).*

*Primary Examiner* — Steven S Anderson, II
*Assistant Examiner* — Phillip Decker
(74) *Attorney, Agent, or Firm* — Fox Rothschild LLP

(57) ABSTRACT

A system and method for controlling air conditioning and ISG systems for a vehicle are provided. The system includes a heater controller that detects a defrost mode selection signal or an A/C blower operation signal and transmits the signal to a cluster controller. The cluster controller then transmits the defrost mode selection signal or the A/C blower operation signal to an engine ECU. The engine ECU determines ISG entry prevention or ISG release after ISG entry in response to receiving the defrost mode selection signal or the A/C blower operation signal from the cluster controller.

8 Claims, 3 Drawing Sheets

(52) U.S. Cl.
CPC .... *F02N 11/084* (2013.01); *B60H 2001/2237* (2013.01); *B60H 2001/2262* (2013.01)

(58) Field of Classification Search
CPC ........ B60H 2001/2237; B60H 1/00785; B60H 1/00778; F02N 11/084; B60K 37/06; B60K 37/04; B60K 2370/139
See application file for complete search history.

(56) References Cited

U.S. PATENT DOCUMENTS

| | | | | |
|---|---|---|---|---|
| 6,521,848 | B2* | 2/2003 | Shibata | H01H 9/26 200/18 |
| 8,347,642 | B2* | 1/2013 | Akahoshi | B60H 1/004 62/133 |
| 8,712,673 | B2* | 4/2014 | Gwon | F02N 11/0818 701/112 |
| 8,838,369 | B2* | 9/2014 | Watanabe | F02D 17/04 701/112 |
| 9,181,916 | B2* | 11/2015 | Wijaya | F02N 11/08 |
| 9,217,408 | B2* | 12/2015 | Yu | B60H 1/00778 |
| 9,248,824 | B2* | 2/2016 | Rademacher | H05B 1/0236 |
| 9,321,349 | B2* | 4/2016 | Graumann | B60K 37/06 |
| 9,789,764 | B2* | 10/2017 | Bissontz | B60L 15/38 |
| 9,994,222 | B2* | 6/2018 | Khafagy | B60W 10/06 |
| 10,183,547 | B2* | 1/2019 | Hall | B60H 1/00828 |
| 2002/0112943 | A1* | 8/2002 | Funfer | B25D 16/006 200/11 R |
| 2004/0144107 | A1* | 7/2004 | Breton | F02N 11/084 62/129 |
| 2005/0193747 | A1* | 9/2005 | Kajimoto | B60H 1/00814 62/133 |
| 2005/0274814 | A1* | 12/2005 | Schwartz | B60H 1/00392 237/28 |
| 2007/0246209 | A1* | 10/2007 | Lee | B60H 1/004 165/202 |
| 2010/0095689 | A1 | 4/2010 | Shiroyama et al. | |
| 2012/0215430 | A1 | 8/2012 | Watanabe et al. | |
| 2012/0282852 | A1 | 11/2012 | Yu et al. | |
| 2013/0317728 | A1 | 11/2013 | Hall et al. | |
| 2014/0358460 | A1* | 12/2014 | Lee | H01M 10/425 702/63 |
| 2015/0217640 | A1 | 8/2015 | Bissontz | |
| 2016/0023534 | A1* | 1/2016 | Miura | F02N 11/084 701/36 |
| 2016/0107652 | A1* | 4/2016 | Kim | B60K 37/02 701/54 |
| 2016/0124224 | A1* | 5/2016 | Moon | B60K 37/02 359/630 |
| 2016/0152242 | A1* | 6/2016 | Lee | B60K 35/00 701/54 |
| 2018/0162214 | A1* | 6/2018 | Yoshida | B60L 50/16 |
| 2018/0253912 | A1* | 9/2018 | Nam | B60K 35/00 |

FOREIGN PATENT DOCUMENTS

| | | | |
|---|---|---|---|
| JP | 2011106441 A | | 6/2011 |
| JP | 201647665 A | * | 4/2016 |
| KR | 10-0165985 | | 1/1999 |
| KR | 100812531 B1 | | 3/2008 |
| KR | 20110064380 A | * | 6/2011 |
| KR | 10-2012-0062559 A | | 6/2012 |
| KR | 20120059231 A | * | 6/2012 |
| KR | 20120110924 A | | 10/2012 |
| KR | 10-1497336 B1 | | 3/2015 |
| KR | 20160071563 A | | 6/2016 |
| WO | 2009153185 A1 | | 12/2009 |

* cited by examiner

SYSTEM AND METHOD FOR CONTROLLING AIR CONDITIONING AND ISG SYSTEMS FOR VEHICLE

CROSS-REFERENCE TO RELATED APPLICATION

This application claims under 35 U.S.C. § 119(a) the benefit of priority to Korean Patent Application No. 10-2017-0117754 filed on Sep. 14, 2017, the entire contents of which are incorporated herein by reference.

BACKGROUND

(a) Technical Field

The present invention relates to a system and method for controlling air conditioning and idle stop & go (ISG) systems for a vehicle, and more particularly, it relates to a system and method for controlling air conditioning and ISG systems for a vehicle, capable of preventing entry into an ISG mode or releasing the ISG mode when an air conditioning system is operated in a defrost mode or at a maximum stage number.

(b) Background Art

An idle stop & go (ISG) system applied to a vehicle is a system that automatically stops an idling engine when the vehicle is stopped, for example, for signal waiting, and then restarts the engine when the vehicle is started, to reduce fuel consumption. However, when the engine is stopped by the ISG system when an air conditioning system is operated in a defrost mode to remove moisture or the like from the windshield glass of the vehicle or when an air conditioner (A/C) is operated at a maximum stage number to decrease an interior temperature fast during warmer temperatures, an A/C compressor operated along with the engine is instantaneously stopped and the air conditioning system is simultaneously stopped, thereby causing a driver and passengers inconvenience.

Accordingly, some vehicles use an ISG entry prevention logic and an ISG release logic according to the operating condition of the air conditioning system. The operating condition of the air conditioning system required for ISG entry prevention and ISG release will be described with reference to FIG. 1 according to the related art. When a driver turns on an ISG operation switch 1, and then selects a defrost mode using an air conditioning mode selection switch 2 to remove moisture from a windshield glass or selects a maximum stage number (e.g., fourth stage) using an A/C blower stage number control switch 3 to rapidly cool the interior so that an ISG mode is released, the air conditioning system may be operated in the defrost mode and the air conditioner may be operated at the maximum stage number.

Further, when the defrost mode is performed or the air conditioner is operated at the maximum stage number when the ISG operation switch is turned off, the entry into the ISG mode is prevented even though the ISG operation switch is turned on. Accordingly, there is a need for a system that performs these ISG entry prevention and ISG release logic processes and implements a simplified circuit and a reduction in the number of parts.

The above information disclosed in this section is merely for enhancement of understanding of the background of the invention and therefore it may contain information that does not form the prior art that is already known in this country to a person of ordinary skill in the art.

SUMMARY

The present invention provides a system and method for controlling air conditioning and ISG systems for a vehicle, capable of reducing the number of parts while simplifying a circuit of a system that performs ISG entry prevention or ISG release when a defrost mode is performed or an A/C blower is operated at a maximum stage number.

In an exemplary embodiment, a system for controlling air conditioning and ISG systems for a vehicle may include a heater controller configured to detect a defrost mode selection signal or an A/C blower operation signal and transmit the signal to a cluster controller, the cluster controller configured to transmit the defrost mode selection signal or the A/C blower operation signal received from the heater controller to an engine electronic control unit (ECU), and the engine ECU configured to determine ISG entry prevention or ISG release after ISG entry in response to the defrost mode selection signal or the A/C blower operation signal received from the cluster controller.

The heater controller may be directly connected to the cluster controller in a pin-to-pin manner for data signal transmission therebetween, and the cluster controller may be communicably connected to the engine ECU via a controller area network (CAN) communication line. The heater controller may be directly connected to the engine ECU in a pin-to-pin manner for data signal transmission therebetween. The heater controller may further include a switch module configured to detect the defrost mode selection signal or the A/C blower operation signal.

The switch module may include a switch operation panel coaxially connected to an air discharge mode selection lever or an air volume control lever, and having a pressure terminal formed integrally therewith, the pressure terminal may protrude from one side of the switch operation panel, a switch body having a push pin formed at one side thereof, and mounted at a position adjacent to the switch operation panel, the push pin configured to generate a switch ON signal when engaged, and a leaf spring that comes into contact with the push pin, mounted to the switch body, and pressed or engaged by the pressure terminal when the switch operation panel rotates.

The engine ECU may allow driving of an engine to be maintained according to an ISG entry prevention logic when the engine ECU receives the defrost mode selection signal before the ISG entry, whereas the engine ECU may allow the engine to be restarted according to an ISG release logic when the engine ECU receives the defrost mode selection signal after the ISG entry. The engine ECU may allow driving of an engine to be maintained according to an ISG entry prevention logic when the engine ECU receives the A/C blower operation signal to determine that an A/C blower is operated at a maximum stage number before the ISG entry, whereas the engine ECU may allow the engine to be restarted according to an ISG release logic when the engine ECU receives the A/C blower operation signal to determine that the A/C blower is operated at the maximum stage number after the ISG entry.

In another exemplary embodiment, a method of controlling air conditioning and ISG systems for a vehicle may include detecting a defrost mode selection signal or an A/C blower operation signal by a heater controller and transmitting the signal to a cluster controller, transmitting the defrost mode selection signal or the A/C blower operation signal, received from the heater controller, from the cluster controller to an engine ECU, and determining ISG entry prevention or ISG release after ISG entry by the engine ECU in response to the defrost mode selection signal or the A/C blower operation signal received from the cluster controller.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
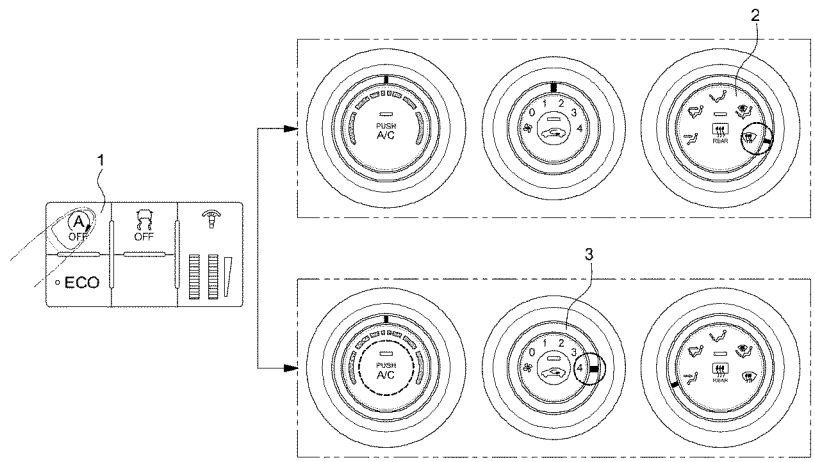
FIG. 1 is a diagram illustrating an operating condition of an air conditioning system required for ISG entry prevention and ISG release according to the prior art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
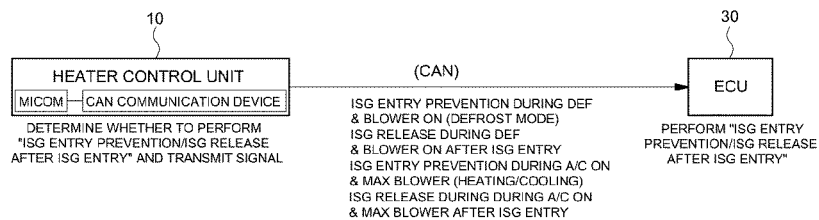
FIG. 2 is a control diagram illustrating a state in which an existing heat controller including a microprocessor and a CAN communication device is connected to an engine ECU through CAN communication according to the prior art.

The configuration and operation for an existing air conditioning system and ISG control will be first described to help understanding of the present invention. FIG. 2 is a control diagram illustrating a state in which an existing heat controller including a microprocessor and a CAN communication device is communicably connected to an engine ECU through a CAN communication line according to the prior art. Reference numeral 10 designates a heater controller and reference numeral 30 designates an engine ECU.

The heater controller 10 includes a microprocessor configured to determine whether to perform ISG entry prevention and ISG release after ISG entry, and a CAN communication device configured to transmit signals indicative of the ISG entry prevention or the ISG release after ISG entry. The engine ECU 30 is configured to receive the signals indicative of the ISG entry prevention or the ISG release after ISG entry, and then operate an engine to be maintained in a driven state for the ISG entry prevention or restarted for the ISG release after ISG entry. In particular, the heater controller 10 and the engine ECU 30 are interconnected via controller area network (CAN) communication for signal exchange therebetween.

For reference, the CAN communication system is a type of vehicle network system that connects various electronic control units in the vehicle via a communication bus line formed of two wires (CAN-high and CAN-low) for data communication, and provides a stable and reliable communication environment in spite of influences such as vibration and noise when the vehicle is being driven. Accordingly, the microprocessor of the heater controller 10 is configured to determine the ISG entry prevention in response to detecting that the current air conditioning mode is selected as a defrost mode and an air conditioner (A/C) blower is turned on before the ISG entry, or determine the ISG release in response to detecting that the current air conditioning mode is selected as the defrost mode and the A/C blower is turned on after the ISG entry.

Alternatively, the microprocessor of the heater controller 10 is configured to determine the ISG entry prevention in response to detecting that an air conditioner is turned on and the A/C blower is operated at a maximum stage number before ISG entry, or determine the ISG release in response to detecting that the air conditioner is turned on and the A/C blower is operated at the maximum stage number after the ISG entry.

When the signals indicative of the ISG entry prevention or the ISG release after ISG entry are transmitted from the CAN communication device of the heater controller 10 to the engine ECU 30, the engine ECU 30 is configured to operate the engine to be maintained in the driven state according to the ISG entry prevention logic or restarted according to the ISG release logic after ISG entry. However, the heater controller 10 includes the microprocessor configured to determine whether to perform the ISG entry prevention and the ISG release after ISG entry, and the CAN communication device configured to transmit signals indicative of the ISG entry prevention or the ISG release after ISG entry, which may lead to a complex circuit of the heater controller 10 and a significant increase in manufacturing cost.

Accordingly, the present invention uses the existing controller (e.g., a cluster controller for providing vehicle information to a front instrument panel of a driver seat) as a data communication medium, and changes the logic of the engine ECU to a logic for determining whether to perform the ISG entry prevention and the ISG release after ISG entry, thereby removing the microprocessor and the CAN communication device included in the heater controller 10. Thus, it may be possible to simplify the circuit of the heater controller and to reduce the number of parts and overall costs.

Figure 3:
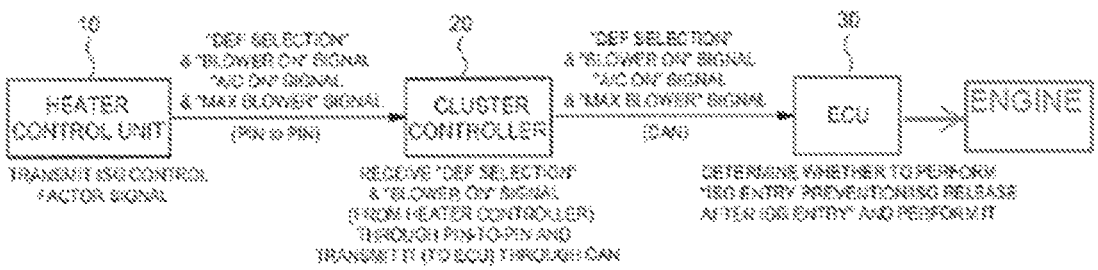
FIGS. 3 and 4 are control diagrams illustrating a system for controlling air conditioning and ISG systems for a vehicle according to an exemplary embodiment of the present invention.

FIG. 3 is a control diagram illustrating a system for controlling air conditioning and ISG systems for a vehicle according to an exemplary embodiment of the present invention. As illustrated in FIG. 3, a heater controller 10 may be directly connected to a cluster controller 20 in a pin-to-pin manner instead of CAN communication for data transmission therebetween.

The pin-to-pin manner is a method of directly connecting an interface harness having pins to a slot formed in a main board of each of controllers to directly transmit data between the controllers. In particular, since the cluster controller 20 is originally connected to an engine ECU 30 via CAN communication, the cluster controller 20 may operate as a device for transmitting data from the heater controller 10 from the engine ECU 30. In other words, when the microprocessor and the CAN communication device included in the heater controller 10 are removed, the signals indicative of the ISG entry prevention or the ISG release after ISG entry (e.g., a defrost mode selection signal and a blower ON signal or an A/C ON signal and an A/C blower operation stage number signal) may be transmitted from the heater controller 10 through the cluster controller 20 to the engine ECU 30.

Figure 4:
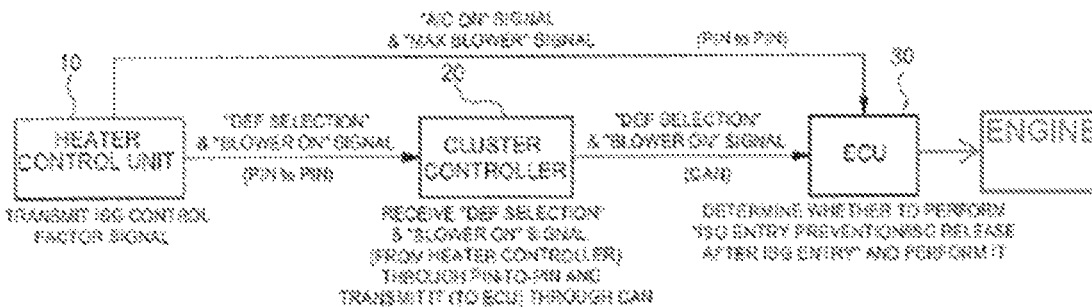
Figure 5:
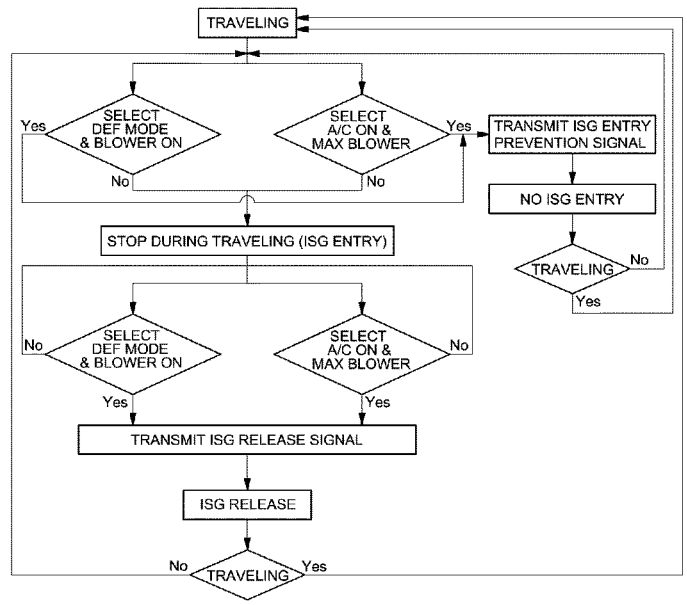
FIG. 5 is a flowchart illustrating an example of a method of controlling air conditioning and ISG systems for a vehicle according to another exemplary embodiment of the present invention.

In another example of the present invention, the heater controller 10 may also be directly connected to the engine ECU 30 in a pin-to-pin manner instead for data transmission therebetween, as illustrated in FIG. 4. Thus, a portion of the signals indicative of the ISG entry prevention or the ISG release after ISG entry may be directly transmitted from the heater controller to the engine ECU 30.

The defrost mode selection signal and the blower ON signal, which are signals indicative of ISG entry prevention or ISG release after ISG entry, may be transmitted from the heater controller 10 via the cluster controller 20 to the engine ECU 30. Further, the A/C ON signal and the A/C blower operation stage number signal may be directly transmitted to the engine ECU 30 connected to the heater controller 10 in the pin-to-pin manner.

Meanwhile, the heater controller 10 may be configured to detect an A/C ON/OFF signal and an A/C blower ON signal using an A/C ON/OFF switch, and detect an A/C blower operation signal (current operation stage number) according to the operation of an air volume control lever (switch). In particular, since the microprocessor included in the heater controller 10, namely the microprocessor for detecting a defrost mode selection signal and an A/C blower operation signal, is removed, the heater controller 10 may include a mechanical switch module 40 configured to detect a defrost mode selection signal and an A/C blower operation signal.

Figure 6:
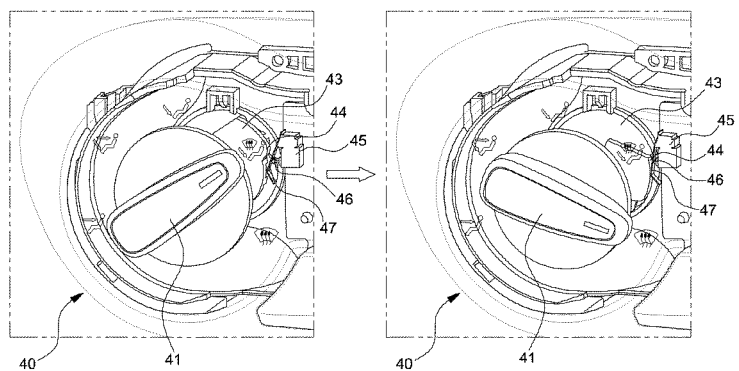
FIG. 6 is a view illustrating a switch module of the system for controlling air conditioning and ISG systems for a vehicle according to the exemplary embodiment of the present invention.

Referring to FIG. 6, the switch module 40 may be installed in a space behind an air discharge selection lever 41, which is a type of lever switch for selecting an air discharge mode, and an air volume control lever which is a type of lever switch for adjusting a heating/cooling stage number. The switch module 40 may include a switch operation panel 43 as one component thereof, and the switch operation panel 43 is coaxially connected to the air discharge selection lever or the air volume control lever. A pressure terminal 44 may be formed integrally with the switch operation panel 43 while protruding from one side thereof.

In addition, a switch body 45 may be mounted independently at a position adjacent to the switch operation panel 43, and a push pin 46 may be formed at one side of the switch body 45. Particularly, when the push pin 46 of the switch body 45 is pressed or engaged, the switch body 45 may be configured to generate a defrost mode selection signal providing a notification that the defrost mode is selected or an A/C blower operation signal providing a notification that an A/C air volume stage number is maximum, as a switch ON signal.

In addition, a leaf spring 47 that comes into contact with the push pin 46 may be mounted to the switch body 45. The leaf spring 47 may specifically press against the push pin 46 while being pressed by the pressure terminal 44 when the switch operation panel 43 rotates. Accordingly, when the driver selects the defrost mode by turning the air discharge selection lever 41, the switch operation panel 43, which is coaxially connected to the air discharge selection lever 41, rotates together and then the pressure terminal 44 of the switch operation panel 43 presses the leaf spring 47. Then, when the push pin 46 of the switch body 45 is pressed by the leaf spring 47, the switch body 45 may be configured to generate the defrost mode selection signal providing a notification that the defrost mode is selected, as a switch ON signal.

Alternatively, when the driver selects the A/C air volume stage number to be maximum (e.g., fourth stage) by turning the air volume control lever, the switch operation panel 43, which is coaxially connected to the air volume control lever, rotates together and then the pressure terminal 44 of the switch operation panel 43 presses the leaf spring 47 while the leaf spring 47 presses the push pin 46. Thus, the switch body 45 may be configured to generate the A/C blower operation signal providing a notification that the A/C air volume stage number is selected to be maximum, as a switch ON signal. The defrost mode selection signal or the A/C blower operation signal generated by the switch body 45 may be transmitted from the heater controller 10 via the cluster controller 20 to the engine ECU 30.

The flow of operation of the system for controlling air conditioning and ISG systems for a vehicle according to the exemplary embodiment of the present invention having the above configuration will be described with reference to FIGS. 3 to 6. The operation itself may be executed by an overall controller. In particular, when the driver selects the defrost mode by turning the air discharge selection lever 41 while the vehicle is being driven (e.g., before ISG entry in which the engine is stopped in an idle state), the A/C blower may be turned on and simultaneously operated at a maximum stage number to remove moisture or the like from the windshield glass, to discharge air toward the windshield glass.

In particular, when driver selects the defrost mode by turning the air discharge selection lever 41 as described above, the pressure terminal 44 of the switch operation panel 43 may be configured to press against the leaf spring 47 while the push pin 46 of the switch body 45 is pressed or engaged. Thus, the switch body 45 may be configured to generate the defrost mode selection signal providing a notification that the defrost mode is selected, as a switch ON signal. Then, the defrost mode selection signal and the A/C blower ON signal generated by the switch body 45 may be transmitted from the heater controller 10 to the cluster controller 20 connected thereto in the pin-to-pin manner, and then may be transmitted from the cluster controller 20 to the engine ECU 30 via CAN communication.

Accordingly, since the engine ECU 30 receives the defrost mode selection signal while the vehicle is being driven, the driving of the engine may be maintained and the defrost mode may be continuously performed according to the ISG entry prevention logic even though the vehicle is stopped. Further, even though the driver selects the defrost mode by turning the air discharge selection lever 41 when the vehicle is stopped after being driven (e.g., after ISG entry in which the engine is stopped in an idle state), the blower may not be operated since power is not supplied thereto since the engine is stopped. Thus, air may not be discharged toward the windshield glass.

Particularly, when the driver selects the defrost mode by turning the air discharge selection lever 41 after the ISG entry, as described above, the pressure terminal 44 of the switch operation panel 43 may be configured to press the leaf spring 47 while the push pin 46 of the switch body 45 is pressed. Thus, the switch body 45 may be configured to generate the defrost mode selection signal providing a notification that the defrost mode is selected, as a switch ON signal. The defrost mode selection signal and the A/C blower ON signal may then be transmitted from the heater controller 10 to the cluster controller 20 connected thereto in the pin-to-pin manner, and transmitted from the cluster controller 20 to the engine ECU 30 via CAN communication.

Accordingly, since the engine ECU 30 receives the defrost mode selection signal after the ISG entry (e.g., after the engine is stopped when the vehicle is stopped), the engine may be restarted according to the ISG release logic after ISG entry. Thus, the A/C blower may be operated by power supplied thereto and the defrost mode may be performed continuously.

Meanwhile, when the driver selects the A/C air volume stage number to be maximum (e.g., fourth stage) by turning the air volume control lever when the driver turns on the A/C switch while the vehicle is being driven (e.g., before ISG entry in which the engine is stopped in an idle state), the A/C blower may be operated at a maximum stage number for rapidly cooling the interior, and thus, air may be discharged to the interior. In particular, when the driver selects the A/C air volume stage number to be maximum by turning the air volume control lever as described above, the pressure terminal 44 of the switch operation panel 43 may be configured to press the leaf spring 47 while the push pin 46 of the switch body 45 is pressed. Thus, the switch body 45 may be configured to generate the A/C blower operation signal providing a notification that the A/C air volume stage number is selected to be maximum, as a switch ON signal.

Further, the A/C ON signal and the A/C blower operation signal generated by the switch body 45 may be transmitted from the heater controller 10 via the cluster controller 20 connected thereto in the pin-to-pin manner to the engine ECU 30, or are directly transmitted to the engine ECU 30 connected to the heater controller 10 in the pin-to-pin manner. Accordingly, since the engine ECU 30 receives the A/C blower operation signal providing the notification that the A/C air volume stage number is selected to be maximum while the vehicle is being driven, the driving of the engine may be maintained and the air conditioner may be continuously operated at a maximum stage number for continuous interior cooling according to the ISG entry prevention logic even though the vehicle is stopped.

Additionally, even though the driver selects the A/C air volume stage number to be maximum by turning the air volume control lever when the vehicle is stopped after being driven (e.g., after ISG entry in which the engine is stopped in an idle state), the blower may not be operated since power is not supplied thereto since the engine is stopped. Thus, air may not be discharged to the interior. In particular, when the driver selects the A/C air volume stage number to be maximum by turning the air volume control lever after the ISG entry, as described above, the pressure terminal 44 of the switch operation panel 43 may be configured to press the leaf spring 47 while the push pin 46 of the switch body 45 is pressed. Thus, the switch body 45 may be configured to generate the A/C air volume stage number selected to be maximum, as a switch ON signal.

Then, the A/C ON signal and the A/C blower operation signal generated by the switch body 45 may be transmitted from the heater controller 10 via the cluster controller 20 connected thereto in the pin-to-pin manner to the engine ECU 30, or may be directly transmitted to the engine ECU 30 connected to the heater controller 10 in the pin-to-pin manner. Accordingly, since the engine ECU 30 receives the A/C blower operation signal providing a notification that the A/C air volume stage number is selected to be maximum after the ISG entry (e.g., after the engine is stopped when the vehicle is stopped), the engine is restarted according to the ISG release logic after ISG entry. Thus, the A/C blower may be operated by power supplied thereto and the air conditioner may be continuously operated at a maximum stage number for more efficiently cooling the interior.

As is apparent from the above description, the present invention has the following effects.

Firstly, it may be possible to improve convenience of passengers by continuing to perform a defrost mode and to operate an air conditioner according to ISG entry prevention or ISG release after ISG entry when the defrost mode is performed or an A/C blower is operated at a maximum stage number.

Secondly, it may be possible to simplify a circuit of a system that performs ISG entry prevention or ISG release after ISG entry and to reduce the number of parts and costs by excluding a separate microprocessor, CAN communication device, etc., which are included in an existing heater controller, from the circuit.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A system for controlling air conditioning and idle stop and go (ISG) systems for a vehicle, comprising:
    a heater controller configured to detect a defrost mode selection signal or an air conditioner (A/C) blower operation signal, and transmit the defrost mode selection signal or the A/C blower operation signal to a cluster controller, the cluster controller being connected to the heater controller by a direct connection in a pin-to-pin manner;
    the cluster controller configured to receive the defrost mode selection signal or the A/C blower operation signal from the heater controller via the direct connection; and
    an engine electronic control unit (ECU) configured to receive the defrost mode selection signal or the A/C blower operation signal from the cluster controller via CAN communication, the engine ECU being communicably connected to the cluster controller through a controller area network (CAN) communication line and being connected to the heater controller in the pin-to-pin manner for signal transmission therebetween, and the engine ECU being configured to determine ISG entry prevention or ISG release after ISG entry.

2. The system of claim 1, wherein the heater controller further comprises a switch module configured to detect the defrost mode selection signal or the A/C blower operation signal.

3. The system of claim 2, wherein the switch module comprises:
    a switch operation panel coaxially connected to an air discharge mode selection lever or an air volume control lever, and having a pressure terminal formed integrally therewith, the pressure terminal protruding from one side of the switch operation panel;
    a switch body having a push pin formed at one side thereof, and mounted at a position adjacent to the switch operation panel, the push pin configured to generate a switch ON signal when pressed; and
    a leaf spring that contacts the push pin, mounted to the switch body, and pressed by the pressure terminal when the switch operation panel rotates.

4. The system of claim 1, wherein the engine ECU is configured to operate an engine to be maintained according to an ISG entry prevention logic in response to receiving the defrost mode selection signal before the ISG entry, and restart the engine according to an ISG release logic in response to receiving the defrost mode selection signal after the ISG entry.

5. The system of claim 1, wherein the engine ECU is configured to operate an engine to be maintained according to an ISG entry prevention logic in response to receiving the A/C blower operation signal to determine that an A/C blower is operated at a maximum stage number before the ISG entry, and is configured to restart the engine according to an ISG release logic in response to receiving the A/C blower operation signal to determine that the A/C blower is operated at the maximum stage number after the ISG entry.

6. A method of controlling air conditioning and idle stop and go (ISG) systems for a vehicle, comprising:
    receiving, by an engine electronic control unit (ECU), a defrost mode selection signal or an air conditioner (A/C) blower operation signal, received from a cluster controller via a heater controller, the cluster controller being connected to the heater controller by a direct connection in a pin-to-pin manner; and
    determining, by the engine ECU, ISG entry prevention or ISG release after ISG entry, the engine ECU being communicably connected to the cluster controller through a controller area network (CAN) communication line and being connected to the heater controller in the pin-to-pin manner for signal translation there-between.

7. The method of claim 6, wherein the engine ECU is configured to operate an engine to be maintained according to an ISG entry prevention logic in response to receiving the defrost mode selection signal before the ISG entry and restart the engine an ISG release logic in response to receiving the defrost mode selection signal after the ISG entry.

8. The method of claim 6, wherein the engine ECU is configured to operate an engine to be maintained according to an ISG entry prevention logic in response to receiving the A/C blower operation signal to determine that an A/C blower is operated at a maximum stage number before the ISG entry and restart the engine according to an ISG release logic in response to receiving the A/C blower operation signal to determine that the A/C blower is operated at the maximum stage number after the ISG entry.

* * * * *